United States Patent [19]

Landragin

[11] Patent Number: 4,972,263
[45] Date of Patent: Nov. 20, 1990

[54] VIDEO SIGNAL CORRECTION DEVICE

[75] Inventor: Jean-Pierre Landragin, Paris, France

[73] Assignee: U.S. Philips Corporation, New York, N.Y.

[21] Appl. No.: 364,337

[22] Filed: Jun. 9, 1989

[30] Foreign Application Priority Data

Jun. 10, 1988 [FR] France ................. 88 07781

[51] Int. Cl.⁵ ........................ H04N 9/64; H04N 5/213
[52] U.S. Cl. ......................................... 358/167; 358/36
[58] Field of Search ................. 358/160, 166, 167, 22, 358/36; 380/7, 14, 15; 455/323

[56] References Cited

U.S. PATENT DOCUMENTS 4,352,126  9/1982  Poncin ................................. 358/167
4,376,952  3/1983  Troiano ............................... 358/167
4,777,648 10/1988  Gardner .............................. 358/167

FOREIGN PATENT DOCUMENTS 0242469 10/1987 European Pat. Off. .

Primary Examiner—James J. Groody
Assistant Examiner—Amir Zarabian
Attorney, Agent, or Firm—Edward W. Goodman

[57] ABSTRACT

A device for correcting line tilt which shows as a parasitic tilt of the plateaus of a video signal, the device includes an adder circuit (37) for adding a correction signal to a video signal to be corrected, the video signal to be corrected (36) being conveyed with its total passband to a first input (47) of the adder and the corrected signal being available at an output (35) of the adder. A second input (48) of the adder is coupled to an output of a frequency filter (38) to whose input (49) the video signal to be corrected is applied.

9 Claims, 2 Drawing Sheets

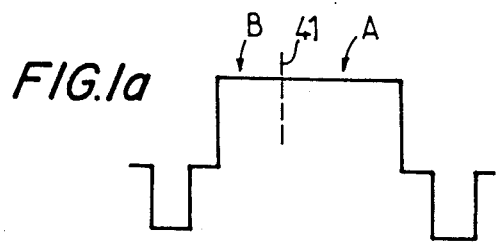
FIG.1a
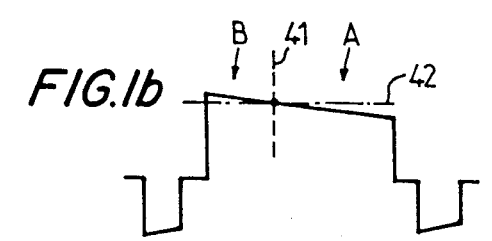
FIG.1b
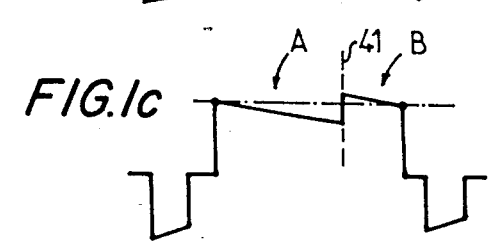
FIG.1c
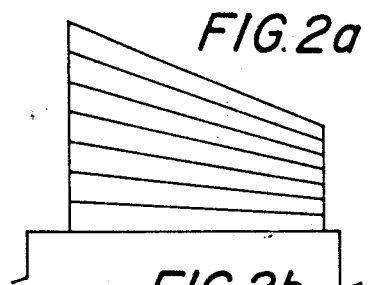
FIG.2a
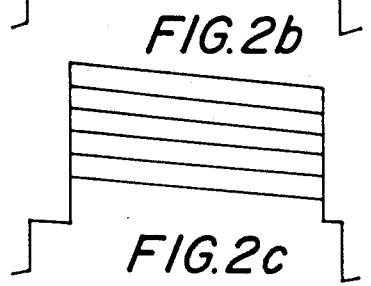
FIG.2b
FIG.2c
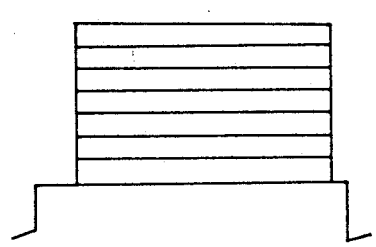
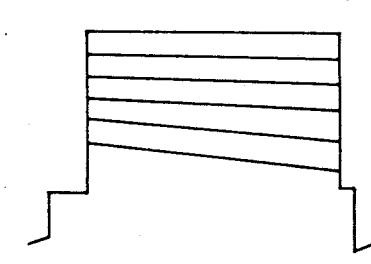
FIG.2d
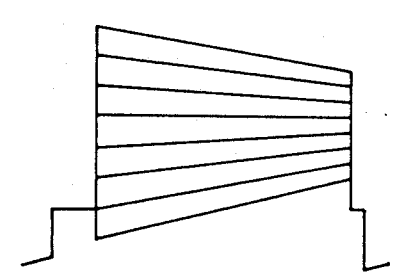
FIG.2e
FIG.3

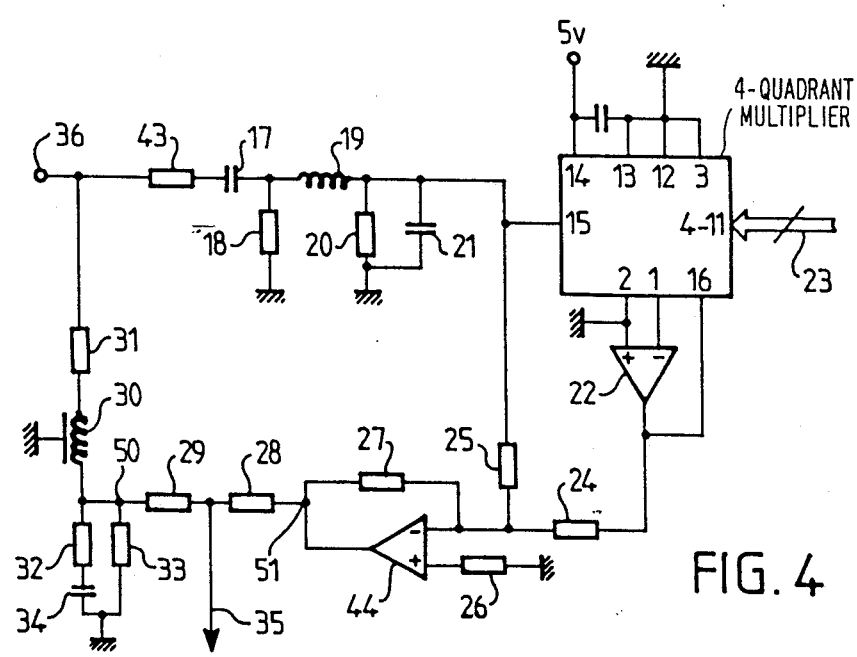
FIG. 4
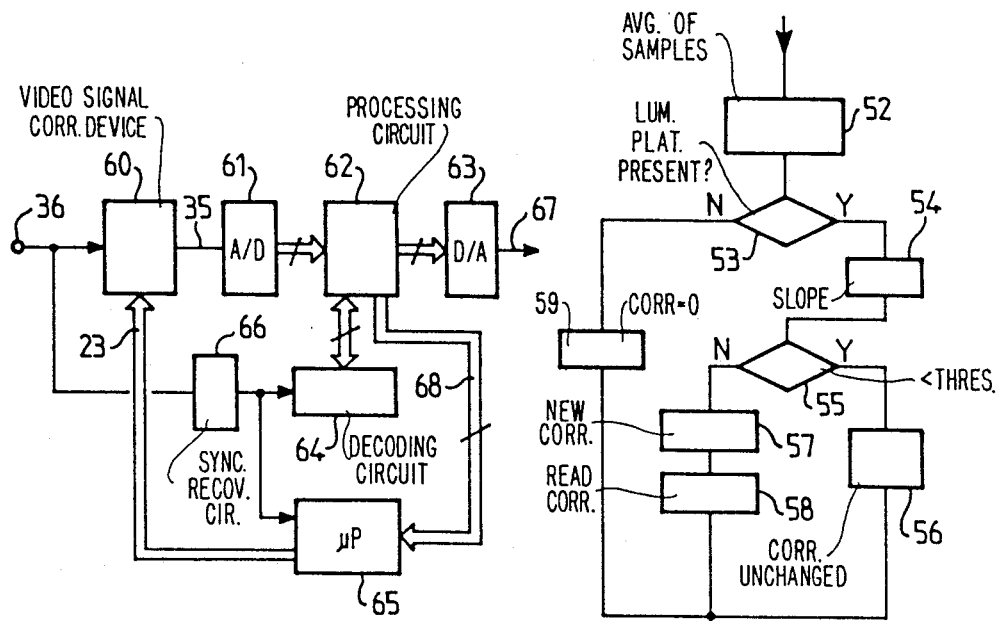
FIG. 5
FIG. 6

VIDEO SIGNAL CORRECTION DEVICE

BACKGROUND OF THE INVENTION

1. Field of the Invention

The invention relates to a device for correcting a video signal affected by line tilt, including an adder circuit for adding a correction signal to a video signal to be corrected, said video signal to be corrected being conveyed with its total passband to a first input of the adder and the corrected signal being available at an output of the adder.

Line tilt is a signal deformation caused by the overall transmission-transfer-receiving assembly, and more specifically by the poor tuning control of the receivers, a frequency shift introducing a deformation because of the attenuated side band.

On reception, the effect shows on the white or grey levels within a video line, in the form of inclined plateaus.

This effect is particularly annoying in the case of a scrambled transmission by pseudo-random permutation of line sections, as, when introduced in the transfer link between the scrambler and the descrambler, the line tilt becomes evident in the fact that the picture elements which are added during the recording operation on either side of the cut off point do not have the same luminance level. The descrambling operation converts this distortion in a "line noise" which is distributed over the image by the pseudo-random generator.

A device to correct this fault is therefore used mainly in television receivers, but can alternatively be useful in professional applications for example for the correction before transmission in cable network head ends.

2. Description of Related Art

The document "A video scrambler/descrambler concept for the PAL format" by M. CHRISTIANSEN et al, Journal of the Institution of Electronic and Radio Engineers, vol. 57, no. 1, pp. 27–35 Jan./Feb. 1987, describes the correction of the line tilt by adding to the video signal a sawtooth of the line frequency, whose amplitude and sign are adjusted to provide the best result.

It has nevertheless been found that by simply adding a sawtooth, it is not possible to correct all the signal types, more specifically because the slope of the level depends on their amplitude. If instead of adding a signal, the signal is multiplied by a sawtooth, it will be found that the method only gives good results in particular cases.

SUMMARY OF THE INVENTION

The invention has for its object to provide a device which gives improved results and which nevertheless remains very simple to realize.

The device according to the invention is more specifically characterized in that a second input of the adder, which is arranged to receive the correction signal, is coupled to an output of a frequency filter to whose input the video signal to be corrected is applied.

The device thus realized adequately corrects all the signals used in practice, whatever their amplitude in particular.

The frequency filter used is advantageously a band-pass filter whose lower cut-off frequency is comprised between 100 Hz and 20 Hz, and whose upper cut-off frequency is comprised between 20 kHz and 1 MHz.

It is moreover desirable to introduce only a portion of the filtered signal into the adder, and to control the amplitude of this signal to optimize the correction. For that purpose controllable means for modifying the amplitude and the polarity of the signal are provided between the output of the filter and the second input of the adder.

There is a risk that when, in a path, a filter is inserted whose output signal is added at least partly to the main signal, transitory signals are deformed, as a result of the group delay introduced by this filter. Advantageously, to obviate this disadvantage, a delay element is inserted in the signal path leading to the first input of the adder.

BRIEF DESCRIPTION OF THE DRAWINGS;

The following description, which is given by way of nonlimitative example with reference to the accompanying drawings, will make it better understood how the invention can be put into effect.

In the Drawings:

FIGS. 1a–1c show several video signals to illustrate the disturbing effect of the line tilt during a scrambling-/descrambling operation;

FIGS. 2a–2e show several video signals to illustrate different correction methods in accordance with the prior art;

FIG. 3 is a basic circuit representation of a device according to the invention;

FIG. 4 is a detailed circuit diagram of an embodiment of the invention;

FIG. 5 is a block circuit diagram of a descrambler provided with a device according to the invention; and FIG. 6 is a flowchart of the operations for the determination of the control value to be applied to the device according to the invention.

DESCRIPTION OF THE PREFERRED EMBODIMENT

FIG. 1a shows a video signal which represents a constant grey level over the overall length of a line. This signal is scrambled by permuting line portions, that is to say that the portion A represents the beginning of the line and the portion B represents the remaining portion of the line. On reception, these portions A and B must be inverted, by separating them at the instant indicated by the line 41.

FIG. 1b shows the same signal after transmission. It is affected by the line tilt fault, which is shown by an abnormal slope relative to the horizontal indicated by the line 42. After permutation of the portions A and B, the signal shown in FIG. 1c has, in the region of the line 41, a parasitic luminance difference which is visible in the reproduced image.

FIG. 2 shows different cases of signals affected by faults or not affected by faults. In each of these cases several different grey levels superposed one on the other in the same line are shown. The signal shown in FIG. 2c is the ideal signal, either available on transmission or obtained on reception after a perfect correction. The signals in FIGS. 2a and 2b shown two typical faults. In FIG. 2a the slope of the levels is proportional to the amplitude, while in FIG. 2b, the slope is constant whatever the amplitude. If an appropriate sawtooth is added to the signal in FIG. 2b, the signal in FIG. 2c is obtained. If the signal in FIG. 2a is multiplied by an appropriate sawtooth, the signal in FIG. 2c is also obtained, and in these particular cases the correction obtained is perfect. But if a constant sawtooth, which corresponds to the slope of the signal for an average amplitude, is added to the FIG. 2a signal, the signal in FIG. 2e is obtained; if the signal in FIG. 2b is multiplied by a sawtooth, the signal in FIG. 2d is obtained. These two signals, FIGS. 2e and 2d are not correct. In order to obtain a proper correction, it is therefore necessary to choose at each instant between multiplication or addition and furthermore to adapt the amplitude of the correction sawtooth. It also occurs that the slope is not constant along the overall line, in which case there is not sawtooth which can give satisfaction.

FIG. 3 shows a basic circuit diagram of a device according to the invention which solves the above problems. A video signal affected by line tilt is applied to an input 36. This signal is conveyed with its complete passband to a first input 47 of an adder 37. A second input 48 of the adder 37 is connected to an output of a filter 38 via controllable means 39, 40, 45, 46, which will be described in detail hereinafter. The input signal at 36 is conveyed to an input 49 of the filter 38 which is a bandpass filter. The corrected signal is supplied from an output 35 of the adder 37.

To compensate for the group delay time of the filter 38, a delay line 30 is incorporated in the signal path leading to the first input 47 of the adder 37. This delay element must not affect the frequency content of the video signal to a significant extent.

So as to control the amplitude and the polarity of the correction signal coming from the filter 38, controllable means 39, 40, 45, 46 are provided between the output of the filter 38 and the second input 48 of the adder 37. These means are constituted by separating the output link of the filter 38 into two channels 45 and 46, the channel 46 including an element 39 which inverts the polarity of the signal without modifying its amplitude or its shape. The channel 45 ends at one of the resistor ends of the resistance of a potentiometer 40, and the output of the element 39 is connected to the other end. This potentiometer is a controllable mixer whose two resistor ends play the role of two inputs for the signals to be mixed. The wiper of the potentiometer, which represents the output of the mixed signal, is connected to the second input 48 of the adder 37. When the wiper is in the extreme lefthand position (in FIG. 3) of the potentiometer 40, the signal coming from the filter 38 is applied directly to the input 48. When the wiper is in the extreme righthand position, the inverted signal is applied to the input 48 that is to say that the output signal of the filter 38 is subtracted from the signal 36 to be corrected. In the exact central position of the wiper the signals which are the inverse of each other flowing in the paths 45 and 46, 39 are subtracted from each other and are cancelled and no correction is effected. All types of intermiate controls are possible. A method to determine the optimum adjustment will be described hereinafter, and also a circuit which performs the function of the potentiometer 40 but may be controlled by electric signals.

In order to prevent a differnce between the inverted signal and the direct signal due to the passage through the inverter 39 it would alternatively be possible to incorporate an operational amplifier (not shown) in each of the channels 45 and 46, conveying the signal to the +input of the amplifier through one of the channels and to the −input via the other channel. It is alternatively possible to use a four-quadrant multiplier which is commercially available as an integrated circuit, one of whose inputs is connected to the output of the filter, the other input is connected to a control signal generator, and whose output is connected to the second input of the adder 37. This solution is utilized in the embodiment which is shown in greater detail in FIG. 4 and which will now be described.

The signal to be corrected is applied to the input 36. From this input a horizontal connection in the Figure leads to the filter 17-21 and a connection directed towards the bottom in the Figure leads to the mixer 28, 29 without modification of the passband.

From the input 36 the resistance bridge 43, 18, which has its end connected to ground, forms a fixed attenuator and, because of the capacitor 17, which is arranged in series with the resistor 43, at the same time forms a first-order high-pass filter, whose cut-off frequency is located between 100 Hz and 20 kHz. In combination with the values indicated hereinafter, the cut-off frequency is here approximately 13 kHz. Arranged in cascade with this filter 43, 17, 18 is a second filter 19, 20, 21 which is constituted by a series-arranged self-induction 19 and a resistor 20 which is arranged in parallel with a capacitor 21 one end of which is connected to ground. This filter is a second-order low-pass filter whose cut-off frequency is located between 20 kHz and 1 MHz. In combination with the values indicated hereinafter, the cut-off frequency is here approximately 700 kHz. The output of this filter is applied to the input 15 of an integrated circuit which is commercially available under the type designation TLC7524. This circuit is a digital-to-analog converter which can perform the four-quadrant multiplier function: the input 15 is arranged to receive an analog signal, and the inputs 4-11 to receive a 8-bit digital value conveyed via a multi-wire conductor 23; the circuit effects the multiplication of the analog signal by the digital value which may be positive or negative, and supplies the result as an analog signal from the output 1. In accordance with the indication given by the constructor, this output is lead to the −input of an operational amplifier 22 whose output is fed-back to the terminal 16 of the integrated circuit. The +5 V supply voltage is applied to the input 14 and the inputs 3, 12, 13 are connected to ground.

The signal available at the terminal 16 of the integrated circuit is mixed with the input signal at the terminal 15 via two resistors 24, 25 which are arranged in series between these two terminals. The junction point of these two resistors is connected to the −input of an operational amplifier 44 which is arranged as a conventional inverter amplifier with feedback to fix the gain by a resistor 27, the +input being connected to ground via a resistor 26. The amplitude and polarity-adjusted correction signal then finally becomes available at the output of the amplifier 44 on the terminal 51.

The other input branch (the vertical branch) includes the delay line 30 arranged in series with a matching resistor 31. The video signal to be corrected is available at 50. A resistor-capacitor network 32-34 acts as an impedance matching and passband correction device for the delay line.

The adder is simply formed by two resistors 28 and 29 arranged in series between the terminal 50 and the terminal 51, the corrected signal ultimately being available at 35, the center point of the two resistors 28, 29.

This circuit is incorporated in the housing of a descrambler associated with a television receiver, between the demodulated video source of the set and the descrambler circuit.

An embodiment using the following elements (FIG. 4) has furnished good results:

| Resistors | Capacitors |
|---|---|
| 18: 100Ω | 17 = 10 nF |
| 20: 100Ω | 21 = 2,2 nF |
| 24: 15Ω | 34 = 820 pF |
| 25: 30Ω | self inductance |
| 26: 7,5Ω | 19 = 22 μH |
| 27: ajustable from 30 80 kΩ | |
| 28: 100Ω | operational amplifiers |
| 29: 100Ω | 22,44 = 2 × ½ LF 353 |
| 31: ajustable, 220Ω max. | |
| 32: 820Ω | delay line |
| 33: 82Ω | delay 0.9 μs |
| 43: 1,1 kΩ | characteristic impedance 150 Ω |

A method of choosing the control value of the correction will now be described. The amplitude control input of the multiplier here being a digital input, the determination of the correction value can be effected by digital means.

In accordance with a recommendation of the CCIR, there is a horizontal plateau in the 17th line, the "luminance plateau". In other standards, equivalent plateaus are always present: the invention can also be used with great advantage in the decoding of transmissions effected in accordance with a MAC standard, for which the "line tilt" problem is particularly serious when scrambling/descrambling is used.

The amplitude of the signal at the two extreme ends of a luminance threshold is, for example, sampled and the measured values are processed in a digital processor. This digital processor can advantageously store several values and by taking the average it can more specifically reduce the occurrence of samples which are incorrect due to noise. The system operates by feedback, the processor calculating the correction which allows of converging in an optimum manner to a deformation less than a predetermined value.

In FIG. 5, which shows a portion of the video channel of a receiver provided with a descrambler, the scrambled signal is applied to the terminal 36 and the descrambled signal is supplied as an output signal from the terminal 67. This signal passes successively through an element 60 which includes the circuit shown in FIG. 4 (with the same input/output reference numerals 36, 23, 35), an analog/digital converter 61, a processing circuit 62, and finally a digital/analog converter 63. The signal from the terminal 36 is also conveyed to a synchronization recovery circuit 66 which applies the instants at which the line and field return start to a decoding circuit 64 and to a microprocessor 65. The element 62 includes more specifically two memories which are used alternately for one line and the other and each of which is capable of storing all the digitized video data of one line, so as to proceed to inversion of line segments by modifying the addressing sequence of the memories. The element 64 is a real-time interface circuit which manages the memory addresses much faster than would be possible for the microprocessor 65 which, in its turn, manages the control words at a lower rate. The overall assembly of these elements 62, 64, 65, 66 therefore serves in known manner for the actual descrambling, which does not form part of the invention.

These same elements are also used to determine the optimum control of the line tilt correction. To this effect the decoding circuit 64 is provided with a time counter which, on the basis of the line retrace instants supplied by the separator 66, supplies a signal at the start and at the end of the luminance plateaus of the test line. In the processing element 62 this signal triggers the taking of several consecutive samples from the signal to be corrected at the beginning of the luminance plateau, and again several consecutive samples at the end of this plateau. The element 62 is provided with additional memories for storing these samples which are thereafter applied via the connection 68 to the microprocessor 65 which calculates the average of the samples of the start of the plateau and the average of the samples of the end of the plateau, and thereafter determines the slope of the luminance plateau from the difference between the samples at the beginning and the end of the plateau. The processor then calculates a correction value and applies it via the connection 23 to the correction element 60 in the form of a word, for example an 8-bit word.

The method of calculation of the microprocessor 65 is shown in FIG. 6, in the form of a flow chart. The rectangles symbolize the following respective operations:

52: calculation of the average of the samples over several fields.
53: testing the presence of the luminance plateau. (Y=yes, N=no)
54: calculation of the slope of the luminance plateau.
55: testing the value of the slope: Y=slope lower than the fixed threshold N=slope above the fixed threshold.
56: unchanged correction.
57: calculation of the new correction.
58: reading the result of the calculation 57.
59: zero correction.

The calculation (operation 52) of the average of the two groups of samples taken allows more particularly to get rid of the influence of noise and rapid fluctuations on the tested reference plateau.

From the value of these groups of samples it is possible to deduce (operation 53) the presence or the absence of the test plateau. If absent, the correction is merely and simply cancelled (an elementary precaution consists in taking this measure only after the absence of the test plateau has been found several times consecutively).

Reading (operation 58) consists in the termination of an average of the correction calculated at a predetermined instant and of a weighted sum of the preceding corrections, in such manner as to avoid an instability in the correction.

Testing in the operation 55 whether the fault is below a predetermined value and, if so, to apply again the preceding correction value renders it possible to avoid oscillations of a small amplitude around the ideal value.

I claim:
1. A device for correcting a video signal affected by line tilt, including an adder circuit for adding a correction signal to said video signal to be corrected, said video signal to be corrected being conveyed with its total passband to a first input of the adder circuit and the corrected signal being available at an output of the adder circuit, characterized in that said device further comprises a frequency filter for providing the correction signal and having an input to which the video signal to be corrected is also applied, and controllable means coupled to an output of the frequency filter for modifying the amplitude and the polarity of correction signal, said controllable means having an output coupled to a second input of said adder circuit.

2. A device as claimed in claim 1, characterized in that the frequency filter is a bandpass filter.

3. A device as claimed in claim 2, characterized in that the bandpass filter is formed by a cascade arrangement of a low-pass filter and a high-pass filter.

4. A device as claimed in claim 2, characterized in that the lower cut-off frequency of the bandpass filter is between 100 Hz and 20 kHz.

5. A device as claimed in claim 2, characterized in that the upper cut-off frequency of the bandpass filter is between 20 kHz and 1 MHz.

6. A device as claimed in claim 1, characterized in that the device further comprises a delay element provided in the signal path leading to the first input of the adder.

7. A device as claimed in claim 1, characterized in that said controllable means are constituted by the separation of the output of the frequency filter into two channels, one of which comprising an inverting element, these two channels each leading to one of two inputs of a controllable mixer whose mixed signal output is coupled to said second input of the adder.

8. A device as claimed in claim 1, characterized in that said controllable means are constituted by a four-quadrant multiplier which has one of its inputs coupled to the output of the frequency filter, another input coupled to a control signal generator, and an output coupled to said second input of the adder.

9. A device as claimed in any one of the claims 2-6, 7, 8 and 1, characterized in that the determination of the control value of the controllable means is realized by a digital processor which, on the basis of a luminance plateau of a test line, takes several consecutive first samples of the video signal to be corrected at the beginning of the luminance plateau, and again several consecutive second samples at the end of the luminance plateau, and thereafter performs a calculation of the average of the first and second samples, respectively, over a plurality of fields, a luminance plateau presence test, a calculation of a slope of the luminance plateau, a test of the value of the slope, and thereafter a calculation of a new correction which permits to proceed in an optimum manner towards a deformation less than a predetermined value.

* * * * *